Aug. 6, 1963   W. F. OTT ETAL   3,100,236
CARBURETOR

Filed March 24, 1960   6 Sheets-Sheet 1

INVENTORS
WILLIAM F. OTT
JOHN H. KREIN
OLIN J. EICKMANN
HAROLD A. CARLSON

BY
*Jul* *Johnson*

AGENT

INVENTORS
WILLIAM F. OTT
JOHN H. KREIN
OLIN J. EICKMANN
HAROLD A. CARLSON

BY

AGENT

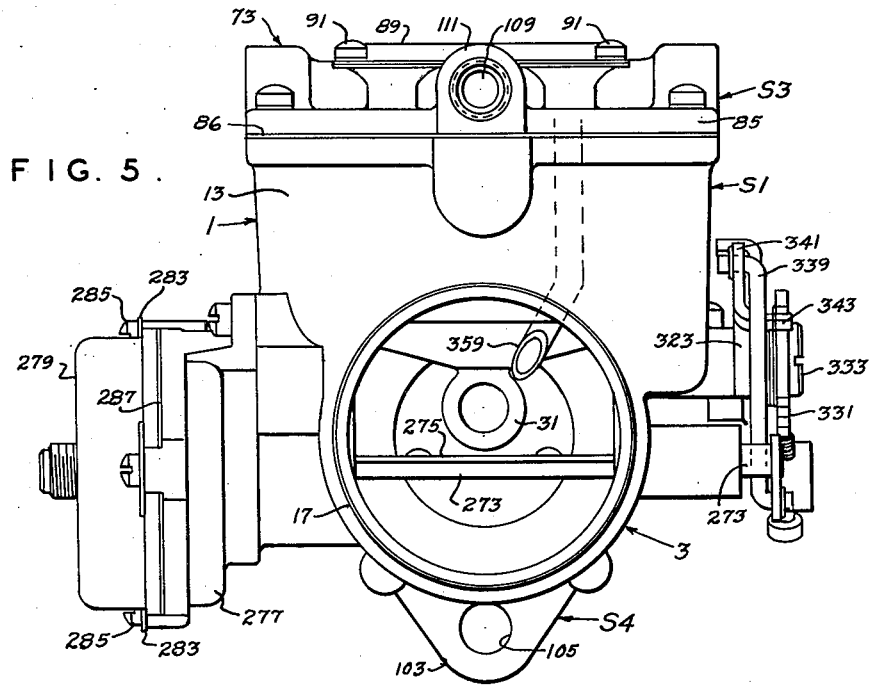
FIG. 5.
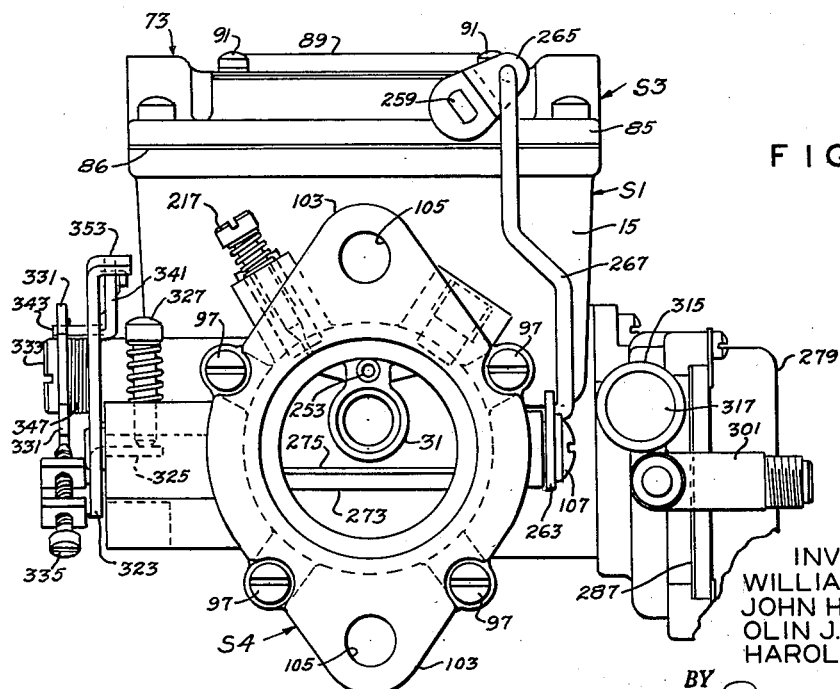
FIG. 6.
INVENTORS
WILLIAM F. OTT
JOHN H. KREIN
OLIN J. EICKMANN
HAROLD A. CARLSON
BY 
AGENT Aug. 6, 1963         W. F. OTT ETAL         3,100,236
                        CARBURETOR
Filed March 24, 1960                    6 Sheets-Sheet 5

INVENTORS
WILLIAM F. OTT
JOHN H. KREIN
OLIN J. EICKMANN
HAROLD A. CARLSON
BY
AGENT

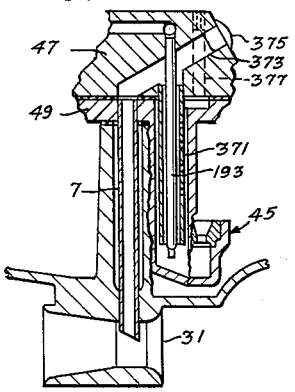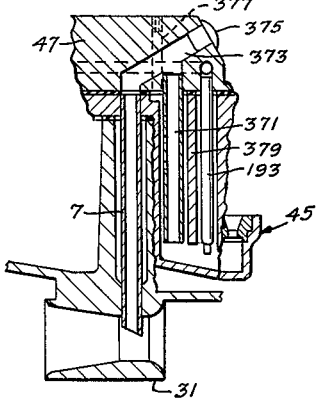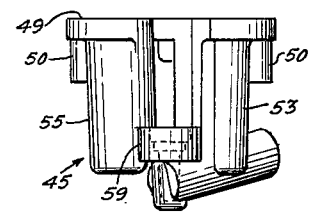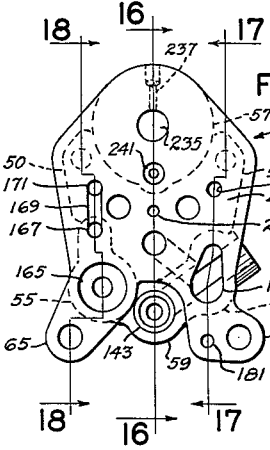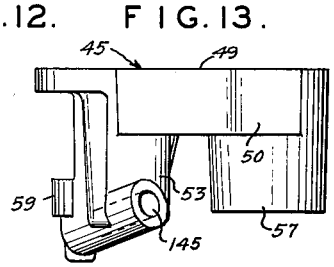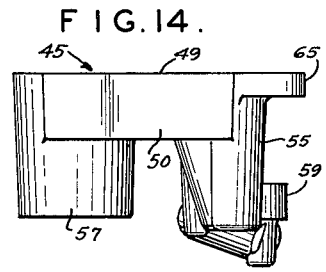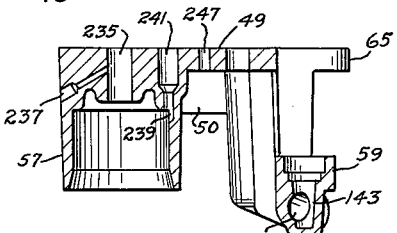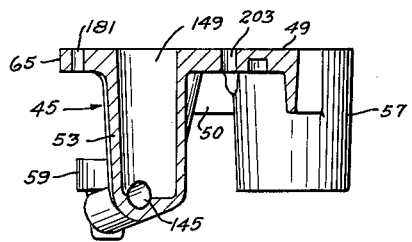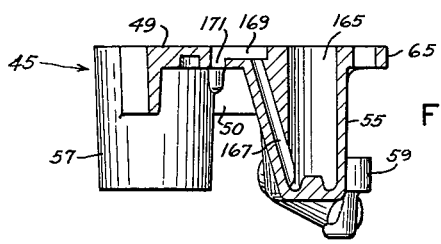

United States Patent Office 3,100,236
Patented Aug. 6, 1963

3,100,236
CARBURETOR
William F. Ott, Affton, John H. Krein, Florissant, Olin J. Eickmann, Normandy, and Harold A. Carlson, Brentwood, Mo., assignors to ACF Industries, Incorporated, New York, N.Y., a corporation of New Jersey
Filed Mar. 24, 1960, Ser. No. 17,383
7 Claims. (Cl. 261—34)

This invention relates to carburetors for internal combustion engines, and more particularly to horizontal carburetors particularly for use on engines of automotive vehicles.

Modern automotive vehicles have low hood lines with resultant intensification of heat around the carburetor in the engine compartment of a vehicle. The heat is further intensified in many instances by the presence of such equipment as air conditioning and power steering equipment in the engine compartment. This heat undesirably tends to prematurely volatilize fuel in the carburetor before it reaches the mixture conduit of the carburetor, and this tendency is aggravated by the increased volatility of modern fuels.

Accordingly, an object of this invention is the provision of an improved construction for a horizontal carburetor which is such as to tend to reduce the effect of heat in the engine compartment upon fuel in the carburetor, so as to reduce the tendency toward premature volatilization of fuel in the carburetor. In general, a horizontal carburetor constructed in accordance with this invention has a fuel bowl and a horizontal mixture conduit, and comprises an assembly of a fuel bowl section and a so-called fuel system section. The latter has the high-speed fuel system of the carburetor embodied therein, this system being adapted to meter fuel from the bowl to the mixture conduit. As will appear, the fuel system section also has part of the idle fuel system and the accelerating fuel system of the carburetor embodied therein. The fuel system section is in effect suspended in the fuel bowl, enclosed by a cover for the fuel bowl. With this construction, the fuel system section may be thermally isolated from the bowl and the cover in such manner as to reduce the transfer of heat thereto, thereby to reduce the tendency toward premature volatilization of fuel in the fuel systems embodied in the fuel system section.

A further object of the invention, apart from the reduction of the effect of heat in the engine compartment, is the provision of a horizontal carburetor construction which has the advantage that one component thereof (the fuel system section) has the various fuel systems therein, and this one component may be pretested prior to assembly with other components to check the functioning of the fuel systems.

Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation illustrating a horizontal carburetor of this invention mounted on the engine of an automotive vehicle;

FIG. 5 is a view in elevation of the carburetor as viewed from the left of FIG. 2, showing the inlet end of the mixture conduit of the carburetor;

FIG. 6 is a view in elevation of the carburetor as viewed from the right of FIG. 2, showing the outlet end of the mixture conduit;

FIG. 12 is a plan view of a part of the fuel system section of the carburetor which is referred to as a metering block;

FIG. 13 is a view in elevation of the metering block as viewed from the right of FIG. 12;

FIG. 14 is a view in elevation of the metering block as viewed from the left of FIG. 12;

FIG. 15 is an end elevation of the metering block as viewed from the bottom of FIG. 12;

Figure 9:
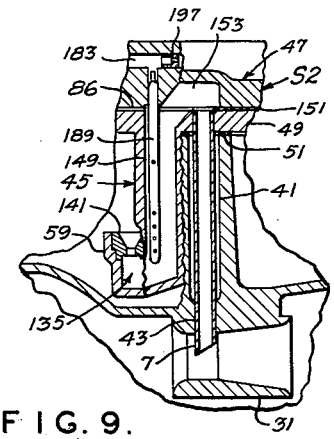
FIG. 9 is a fragmentary section illustrating details of the high speed fuel system of the carburetor.

FIGS. 16, 17 and 18 are vertical sections taken on lines 16—16, 17—17 and 18—18, respectively, of FIG. 12;

FIG. 19 is a section similar to FIG. 9 showing a modification; and,

FIG. 20 is another section similar to FIG. 9 showing another possible modification.

Corresponding reference characters indicate corresponding parts throughout the several views of the drawings.

Figure 1:
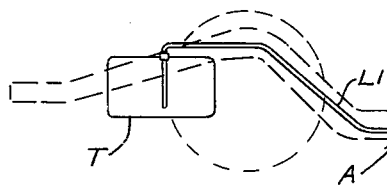
Figure 1:
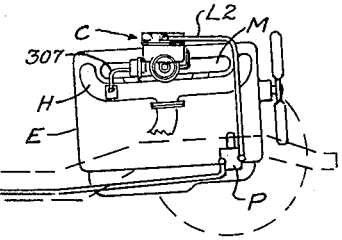

Referring to the drawings, there is indicated at A in FIG. 1 an automotive vehicle having an engine E on which is a carburetor C of this invention. Fuel is supplied to the carburetor C from the fuel tank T of the vehicle. As shown, fuel is supplied from the tank through a line L1 to a fuel pump P on the engine. Pump P is operated by the engine and is adapted to pump fuel to the carburetor through a line L2. The carburetor is mounted on the intake manifold M of the engine. The exhaust manifold of the engine is indicated at H. It will be understood that an air filter (not shown) is used to filter air entering the carburetor.

Carburetor C is a single-bore horizontal carburetor, having a fuel bowl 1 and an adjacent horizontal mixture conduit 3. Air is adapted to flow horizontally through the mixture conduit to the intake manifold M of engine E under control of a throttle valve 5 at the outlet end of the mixture conduit. Fuel is adapted to be supplied to the mixture conduit from the bowl through a fuel nozzle 7 for admixture with the air to provide a combustible mixture of air and fuel. As shown, the carburetor consists of an assembly of four individual sections which are designated S1, S2, S3 and S4.

Figure 7:
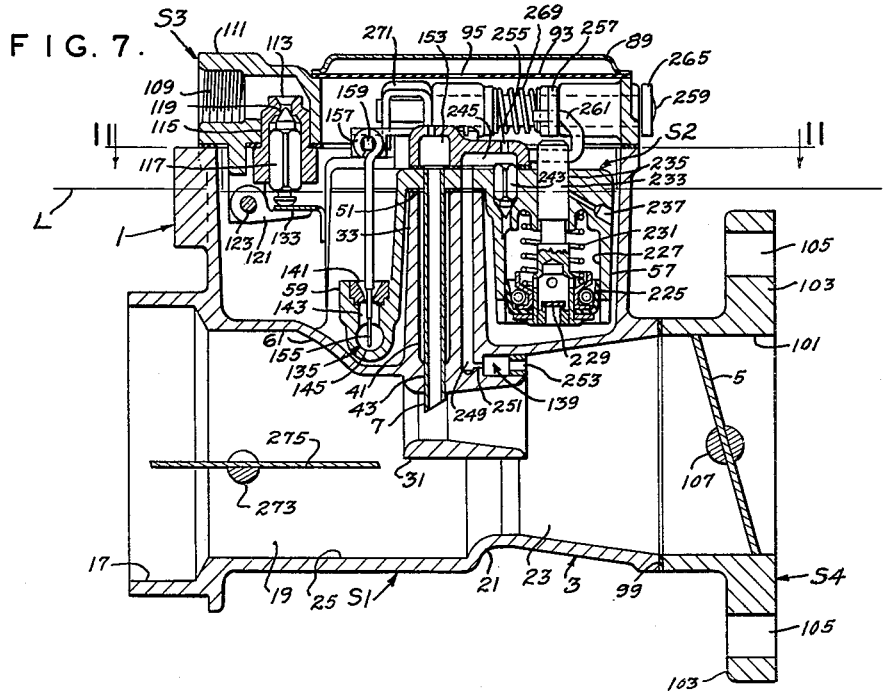
FIG. 7 is a vertical longitudinal section of the carburetor taken essentially on line 7—7 of FIG. 2.
Figure 8:
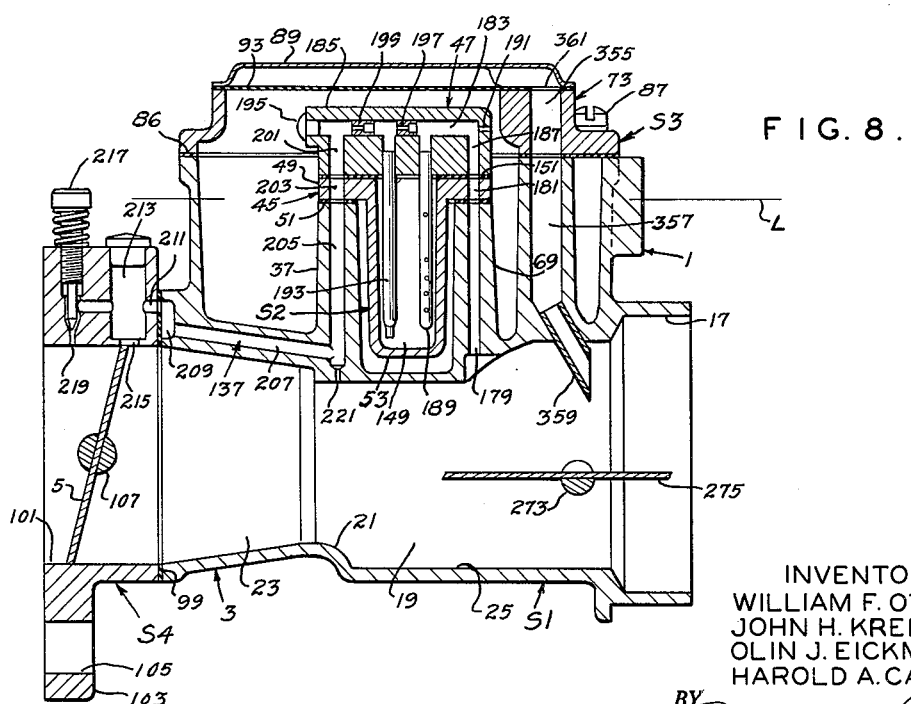
FIG. 8 is a vertical longitudinal section of the carburetor taken essentially on line 8—8 of FIG. 2.
Figure 10:
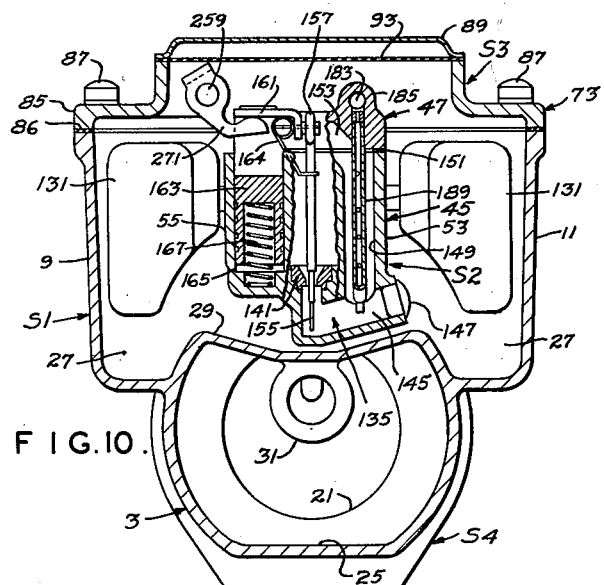
FIG. 10 is a transverse section taken essentially on line 10—10 of FIG. 2.
Figure 11:
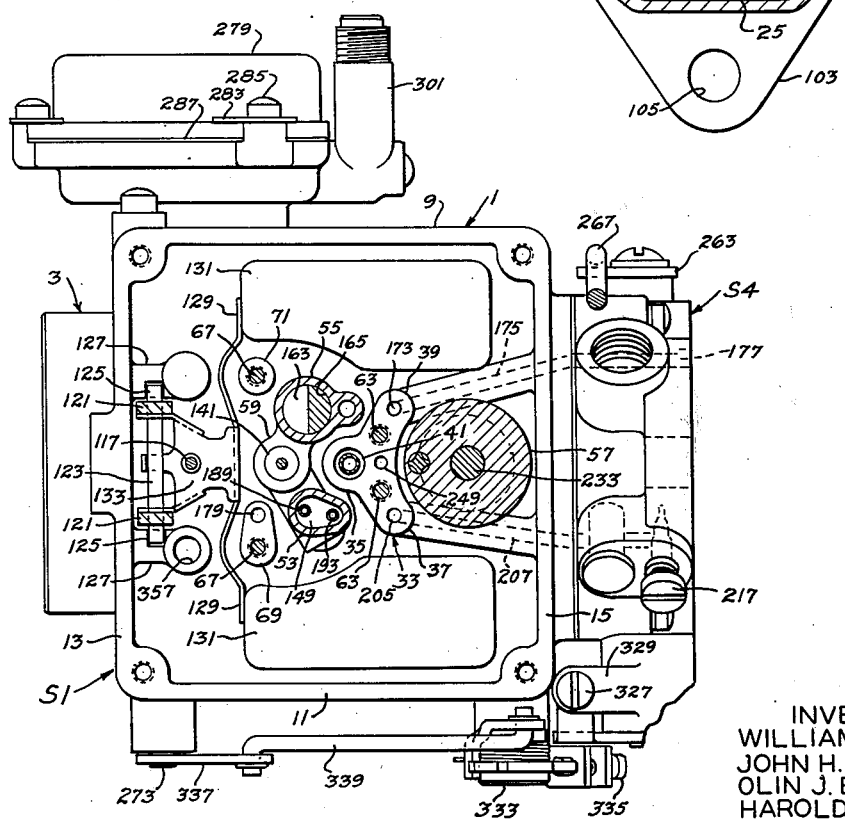
FIG. 11 is a horizontal section taken essentially on line 11—11 of FIG. 7.

Section S1 is a casting (an aluminum base alloy die casting, for example) which is formed to provide both the fuel bowl 1 and the mixture conduit 3. It may be referred to either as the main body or the fuel bowl section of the carburetor. The fuel bowl 1 is located directly above the mixture conduit 3. It is of rectangular shape in plan (see FIG. 11), having vertical end walls 9 and 11 parallel to and on opposite sides of the central vertical plane of the mixture conduit and vertical transverse walls 13 and 15 at right angles to the vertical central plane of the mixture conduit. The latter is constituted by an integral horizontal tubular formation extending underneath the bowl 1. The mixture conduit is interiorly formed to constitute a main venturi, with a cylindrical air inlet 17. The main venturi, as shown in FIGS. 7 and 8, has an entrance portion 19 which converges from inlet 17 to a constriction 21 and an exit portion 23 which diverges from the constriction. The bottom of the mixture conduit 3 is flat as indicated at 25 (see FIGS. 7, 8 and 10) from the inlet 17 to the venturi constriction 21. The bottom of the fuel bowl 1, which in part constitutes the top of the mixture conduit, is so formed that the bowl has relatively deep portions 27 adjacent the bowl end walls 9 and 11 (see FIG. 10). The top portion of the mixture conduit 3 extends upward to some extent between these deep portions 27, and is dished as indicated at 29 in FIG. 10.

Fuel bowl section S1 is integrally formed with a primary venturi 31 in the mixture conduit 3 extending downward from the top of the mixture conduit and generally centrally located as regards the bowl 1. Section S1 is also formed with a boss or stem 33 which extends up from the bottom of the bowl 1 nearly to the top of the bowl approximately at the center of the bowl. As appears in FIG. 11, this boss or stem 33 is generally of Y-shape in plan, having a central portion 35 and laterally extending curved wing portions 37 and 39. The central portion 35 of the stem 33 has a vertical hole 41 therein which extends down from the top of the stem to a smaller coaxial hole 43 (see FIGS. 7, 9 and 11), the latter extending down into communication with the interior of the primary venturi 31. The vertical axis of these holes is approximately coincident with the center of the bowl. The nozzle 7 of the carburetor is constituted by a metal tube which has its upper end secured in and which extends down from section S2 through the holes 41 and 43, having a press fit in the hole 43 and projecting into the primary venturi 31.

Section S2 is in effect suspended in the fuel bowl, being mounted on top of the stem 33. It is essentially a two-piece section, comprising a main body 45 which is referred to as a metering block, and a cap 47 thereon (see FIGS. 7–10). Metering block 45 is illustrated per se in FIGS. 12–18. It may be cast from metal or molded of a suitable plastic. The latter may be preferred because of the thermal nonconductivity of plastic. The metering block 45 is formed to have a horizontal web portion 49 with downwardly extending rim portions 50 thereon. Web 49 seats on top of the stem 33, with a gasket 51 (see FIGS. 7–9) therebetween. If the metering block is made of metal, this gasket 51 will be made of heat-insulating material thermally to insulate web 49 from boss 33 of section S1. If the metering block is made of plastic (preferably a thermosetting plastic), the heat insulation characteristic of the gasket 51 is not critical. The metering block 45 is also formed with three depending portions or bosses 53, 55 and 57 extending downward from the web 49 thereof into the fuel bowl 1 alongside the stem 33, and with a ledge 59 extending between the bosses 53 and 55 at their lower ends. This ledge is located adjacent the bottom of the fuel bowl 1 in a relatively deep portion of the bowl provided by an inclined portion 61 of section S1 (see FIG. 7). The metering block cap 47 is secured on top of the web 49 of the metering block and both these parts are secured on top of the stem 33 by means of screws 63 (see FIGS. 2 and 11) threaded in tapped holes in the stem 33. The web 49 of the metering block 45 further has ear portions 65 receiving screws 67 (see FIG. 2) which are threaded in tapped holes in the upper ends of posts 69 and 71 (see FIG. 11) which extend up from the bottom of the bowl 1, these posts being integrally cast as part of section S1.

Section S3 constitutes a cover for the fuel bowl 1 and section S2. It comprises a casting (which may be a metal casting) designated in its entirety by the reference character 73 having vertical wall portions 75, 77, 79 and 81 (see FIG. 2) bounding a generally rectangular opening 83 and a bottom flange 85 which bears on the rim of the fuel bowl 1. A gasket 86 is interposed between the flange 85 of casting 73 and the rim of the fuel bowl. The casting 73 is secured to the bowl by screws 87 threaded in tapped holes at the corners of the bowl. The rectangular opening 83 is closed by a sheet metal dust cover 89 which is attached to the top of walls 75, 77, 79 and 81 by means of screws 91 which are threaded in tapped holes at the corners of these walls, a gasket 93 being interposed between the dust cover 89 and the upper edges of the walls. This gasket spans the rectangular opening 83 and has a small center hole 95 therein (see FIG. 7).

Section S4 constitutes the throttle body of the carburetor. It comprises a casting (which may be a metal casting) fastened to the outlet end of the mixture conduit 3 by screws 97, with a gasket 99 interposed therebetween. The throttle body S4 is formed to provide a cylindrical throttle bore 101 constituting an extension of the mixture conduit 3, and has a vertical flange portion 103 provided with holes 105 for receiving screws (not shown) for mounting the carburetor on the intake manifold M of the engine E. A throttle shaft 107 extends horizontally diametrically across the throttle bore 101. The throttle valve 5 is secured to the throttle shaft 107 within the throttle bore 101.

Figure 2:
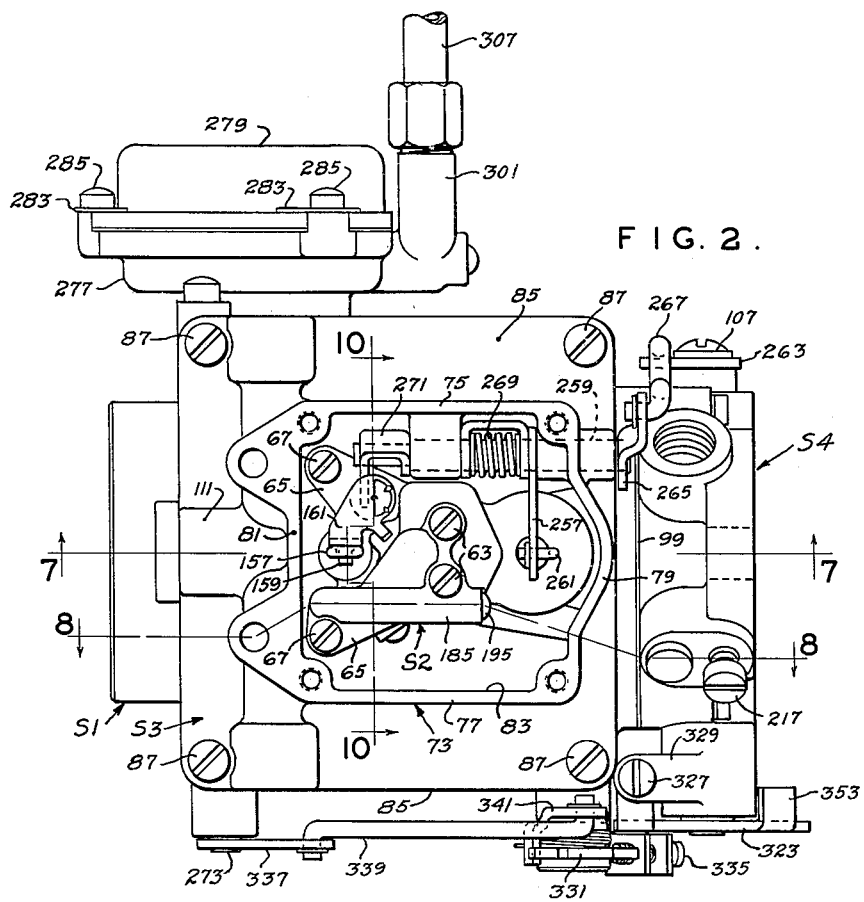
FIG. 2 is a plan view of the carburetor on a much larger scale than in FIG. 1, and showing the carburetor as it appears with certain cover parts removed.
Figure 3:
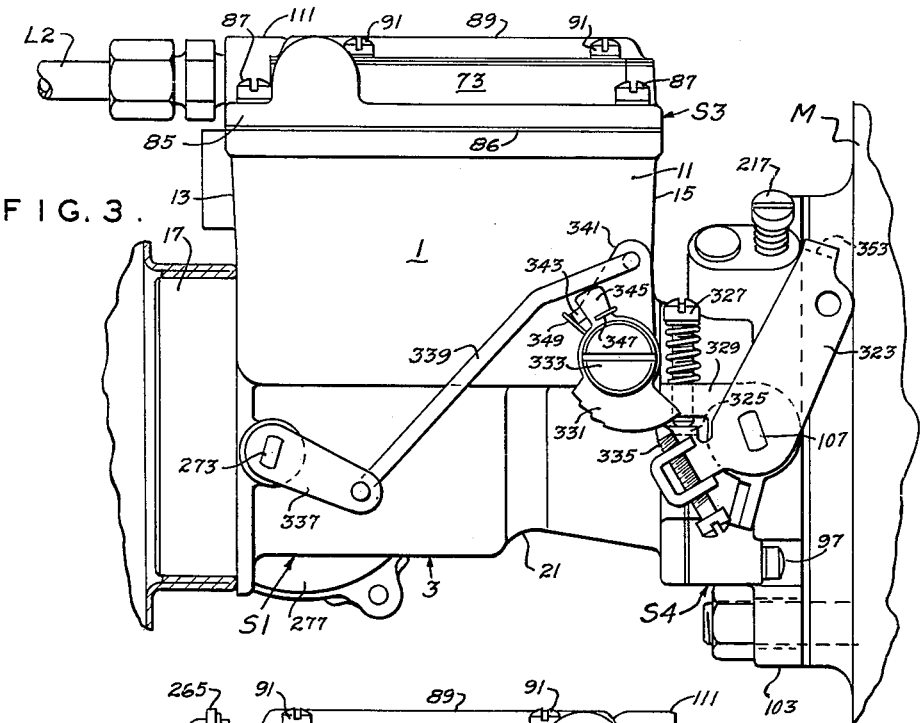
FIG. 3 is a view in elevation of the carburetor as viewed from the bottom of FIG. 2.

The bowl cover section S3 has a horizontal fuel inlet 109 in a boss 111 which extends out from the wall 81 of section S3 (see FIGS. 2 and 7). This inlet is tapped for connection of the aforesaid fuel line L2. A needle valve body 113 is secured in a hole 115 in boss 111 adjacent the inner end of the fuel inlet 109. This needle valve body extends downward from the fuel inlet 109 into the bowl 1. It has a needle valve 117 vertically slidable therein and is formed to provide a seat 119 for the valve (see FIG. 7). Arms 121 (see FIGS. 7 and 11) pivoted on a horizontal rod 123 mounted in grooves 125 in ribs 127 on the inside of wall 13 of the bowl 1 carry a yoke 129 having floats 131 at its ends. These floats are located in the bowl on opposite sides of the boss 33. The yoke has a portion 133 engageable by the lower end of the needle valve 117, the arrangement being such that the floats hold the needle valve closed when the fuel is at a predetermined level in the bowl such as indicated at L. When the fuel level drops, the yoke swings downward, permitting the needle valve to open to admit fuel to the bowl, and fuel flows into the bowl until level L is restored and then the needle valve closes. It will be understood that an alternative arrangement in which the needle valve body and the needle valve extend horizontally instead of vertically may be used.

Section S2 (comprising metering block 45 and cap 47) has embodied therein the high speed fuel system 135 (see FIGS. 7, 9 and 10) of the carburetor, i.e., the system for supplying fuel from the bowl 1 to the nozzle 7 at engine speeds above idle, this system including means for metering the fuel to provide different air/fuel ratios. It also has embodied therein part of the idle fuel system 137 (see FIG. 8) of the carburetor, i.e., the system for supplying fuel from the bowl to the mixture conduit 3 when the engine is idling. It further has embodied therein the accelerating fuel system 139 (see FIG. 7) of the carburetor, i.e., the system for pumping fuel from the bowl to the mixture conduit on acceleration. Thus, section S2 may be referred to as the fuel system section, the subassembly structure or cluster of the carburetor. It is suspended in fuel bowl 1 enclosed between section S1 (the fuel bowl section) and section S3 (the bowl cover section).

The high speed fuel system 135 of the carburetor takes in fuel from the bowl 1 through a metering jet 141 (see FIGS. 7, 9 and 10) secured in a counterbore at the upper end of a vertical hole 143 (see FIGS. 7, 12 and 16) which extends down from the top of the aforesaid ledge 59 on the metering block 45 of section S2. An inclined cross-passage 145 (see FIGS. 10, 13, 16 and 17) is drilled into ledge 59 to an intersection with the lower end of the hole 143. The outer end of this inclined cross-passage is plugged as indicated at 147 in FIG. 10. The depending boss 53 of the metering block 45 is formed with a vertical hole 149 (see FIGS. 8-12 and 17) of pear shape in cross section extending down from the top of the block to the inclined cross-passage 145. This hole 149, which constitutes a fuel well in the metering block 45, is capped by cap 47. A gasket 151 is interposed between the cap 47 and the metering block 45. The cap 47 has a bottom recess 153 (see FIGS. 7 and 9) which provides for communication from the fuel well 149 to the upper end of the nozzle 7. Accordingly, fuel is adapted to flow from the bowl 1 through the orifice in the metering jet 141, thence downward through hole 143, through the cross-passage 145 to the fuel well 149 and thence upward in the fuel well and through the recess 153 to the upper end of the nozzle 7, and thence downward through the nozzle 7 to the mixture conduit 3 within the primary venturi 31.

The stated flow of fuel through the orifice of the metering jet 141 and thence to the nozzle 7 is adapted to be metered by a metering rod 155 (see FIGS. 7 and 10) having a stepped lower end portion (two steps being shown) which is movable up and down in the orifice in the metering jet. The metering rod, at its upper end, is formed with an eye 157 by means of which it is pivoted on a pin 159 which extends horizontally from an arm 161 mounted on the upper end of a vacuum-responsive step-up piston 163. Rod 155 is biased against one side of the orifice in jet 141 by a spring 164. Piston 163 is vertically slidable in a vertical cylinder 165 (see FIGS. 10-12 and 18) formed in the boss 55 of the metering block 45. The step-up piston 163 is biased upward by a spring 167 (see FIG. 10), and is adapted to move downward under the influence of vacuum in the lower part of the cylinder 165 transmitted thereto from the mixture conduit 3 downstream from the throttle valve 5 via a vacuum passage system comprising an inclined hole 167 (see FIG. 18) drilled in the metering block 45 and intersecting the lower end of the cylinder 165, which is otherwise enclosed. This inclined hole 167 extends downward from a recess 169 in the top of web 49 of the metering block (see FIGS. 12 and 18). From this recess, which is capped by cap 47, there is a hole 171 in the web 49 of the metering block which extends down from the top of the metering block. Hole 171 registers with a vertical hole 173 (see FIG. 11) in wing 39 of stem 33. From the lower end of hole 173 there is a passage 175 in section S1 extending to a vacuum port 177 in throttle body S4.

Post 69 has a vertical hole 179 (see FIGS. 8 and 11) extending down from the top thereof to the mixture conduit 3. The web 49 of metering block 45 has a vertical hole 181 (see FIGS. 8, 12 and 17) registering with hole 179. Cap 47 (which is made of metal if block 45 is made of metal, plastic if block 45 is made of plastic) has a horizontal hole 183 extending from one end of a rib 185 on the cap (see FIGS. 2, 8 and 10). Extending down from the inner end of hole 183 is a vertical hole 187 (see FIG. 8) registering with hole 181. A perforated air bleed tube 189 (see FIGS. 8–11) has its upper end press-fitted in a vertical hole in cap 47 extending down from the horizontal hole 183 in the cap into the fuel well 149. Thus, provision is made for bleeding air into the fuel well 149 via holes 179, 181, 187, 183 and depending air bleed tube 189. A bleed 191 (see FIG. 8) is provided in cap 47 at the inner end of horizontal hole 183 to prevent siphoning of fuel from the fuel well 149 through tube 189 and hole 179 to the mixture conduit 3.

The idle fuel system 137 of the carburetor comprises a depending idle fuel tube 193 (see FIGS. 8 and 11) having its upper end press-fitted in a vertical hole in cap 47 extending down from the horizontal hole 183 in the cap into the fuel well 149 alongside the air bleed tube 189. The outer end of hole 183 is plugged as indicated at 195 (see FIGS. 2 and 8) after insertion therein of an idle by-pass air bleed 197 which is positioned between the upper ends of the holes for tubes 189 and 193 and an economizer 199 which is positioned between the upper end of the hole for tube 193 and the outer end of hole 183. Cap 47 has a vertical hole 201 extending down from hole 183 between the plug 195 and the economizer 199 registering with a vertical hole 203 in the web 49 of metering block 45. Hole 203 registers with a vertical hole 205 in wing 37 of stem 33 (see FIGS. 8 and 11). Section S1 has an inclined hole 207 extending from a recess 209 at the end of conduit 3 engaged by throttle body S4 to the lower end of hole 205. Recess 209 communicates via passage 211 in throttle body S4 with an idle port recess 213 in the top of body S4, and an idle port 215 provides for communication from recess 213 into the throttle bore 101. An idle adjusting screw 217 is threaded in body S4 and extends into an idle adjustment screw port 219. An idle bleed 221 (see FIG. 8) extends down to conduit 3 from the lower end of the vertical hole 205 in boss 33.

From the above, it will appear that fuel for idling is adapted to flow upward through idle tube 193 (which has a restricted lower end constituting an idle metering jet) to horizontal hole or passage 183. Here it starts to mix with air entering through idle by-pass air bleed 197. Economizer 199 speeds up the flow and further mixes the fuel and air. The mixture is delivered via passaging 201, 203, 205, 207, 209, 211 and 213 to idle port 215. Air may bleed into passage 207 via idle bleed 221 for leaning the idle mixture. Under some circumstances, fuel may flow through bleed 221 into the mixture conduit when throttle valve 5 is open for mixture enrichment.

The accelerating fuel system 139 of the carburetor comprises a pump designated in its entirety by reference character 223 including a pump piston 225 (see FIG. 7) slidable in a vertical cylindrical recess or cylinder 227 (see FIG. 16) in boss 57 on metering block 45. This pump cylinder 227 extends up from the bottom of boss 57 and is open at the bottom to the fuel bowl 1. The pump piston 225 has a check valve 229 incorporated therein which constitutes an inlet check for the space in cylinder 227 above the piston, adapted to open for priming the cylinder and to close on upward movement of the piston. The piston is biased downward by a spring 231 and has a rod 233 extending upward therefrom slidable in a vertical hole 235 in the metering block 45. The latter has an inclined hole 237 (see FIGS. 7 and 16) providing for communication between the fuel bowl 1 and the hole 235. This provides a fuel seal on piston rod 233 to keep air out of cylinder 227 and a return to the bowl for any fuel leaking up through hole 235 around the piston rod.

The metering block 45 has a pump outlet passage 239 extending from the top of cylinder 227 to a discharge check valve recess 241 in the top of the block (see FIG. 16). A discharge check valve 243 (see FIG. 7) is vertically slidable in this recess. Cap 47 on the metering block 45 has a bottom recess 245 providing for communication from valve recess 241 to a vertical hole 247 (see FIGS. 12 and 16) in web 49 of the metering block. Hole 247 registers with a vertical hole 249 (see FIGS. 7 and 11) in the boss 33. Fuel is adapted to exit from the lower end portion of hole 249 via an orifice 251 and a pump jet 253, the latter discharging fuel in downstream direction into the mixture conduit 3. Cap 47 has an anti-siphon bleed hole 255 (see FIG. 7) directly above discharge check valve 243 which is open when valve 243 is down, and which is closed by valve 243 when the latter rises on an upward discharge stroke of pump piston 225.

Figure 4:
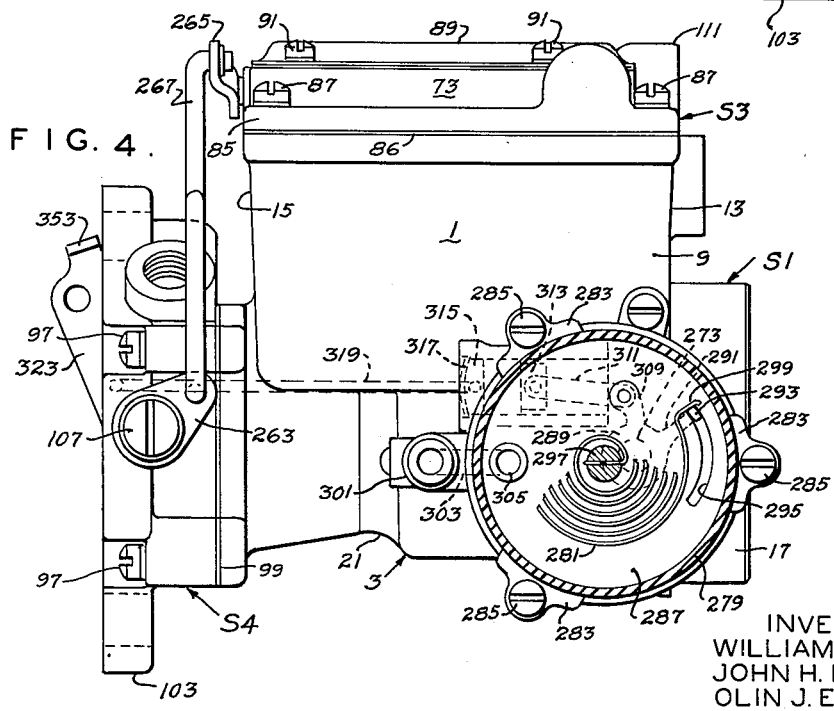
FIG. 4 is a view in elevation of the carburetor as viewed from the top of FIG. 2, with a choke control cover broken away and shown in section, and with a choke thermostat partly broken away.

The pump piston 225 is adapted to be pulled upward against the downward return bias of pump spring 231 by an arm 257 on a horizontal rock shaft 259 journalled in the cover section S3, arm 257 being connected to the upper end of the piston rod 233 by a link 261. Shaft 259 is operated from the throttle shaft 107 by means of a linkage comprising an arm 263 on one end of the throttle shaft, an arm 265 on the outer end of shaft 259, and a link 267 interconnecting arms 263 and 265 (see FIGS. 2, 4 and 6). The arrangement is such that when the throttle valve 5 is closed, pump piston 225 is down, and when the throttle shaft 107 is turned in throttle-opening direction, the pump piston is pulled upward through a discharge stroke. A spring 269 biases rock shaft 259 to rotate in throttle-closing direction. Rock shaft 259 has an arm 271 (see FIG. 10 particularly) at its inner end which extends under the aforesaid arm 161 on the upper end of the step-up piston 163. Arm 271 is adapted to lift the step-up piston thereby to lift metering rod 155 when the throttle valve 5 is opened even though vacuum in the lower end of cylinder 165 may be tending to hold the step-up piston down.

A choke shaft 273 (see FIGS. 2–5, 7 and 8) extends horizontally across the mixture conduit 3 adjacent the mixture conduit inlet 17. The choke shaft is offset downward from the central horizontal plane of the mixture shaft and carries a choke valve 275, which is unbalanced to open, as is apparent from FIGS. 7 and 8. One end of the choke shaft extends into a cup-shaped casing 277 cast integrally on section S1. Casing 277 is closed by a cup-shaped cover 279 containing a choke thermostatic coil 281 (see FIG. 4). Cover 279 is rotatable on casing 277, clamping members 283 and clamp screws 285 being provided for clamping the cover in various positions of angular adjustment relative to the casing. A partition or baffle plate 287 is provided between the casing and the cover. A choke lever 289 is fastened on the end of the choke shaft 273 in casing 277. This lever has a radial arm 291 having a finger 293 extending laterally therefrom through an arcuate slot 295 in partition 287. Cover 279 has a center stud 297, the inner end of thermostatic coil 281 being secured to this stud as appears in FIG. 4. The coil has a hook 299 at its outer end which engages finger 293, the arrangement being such that the coil acts as a spring tending to close choke valve 275, relaxing when heated to permit the choke valve to open. Casing 277 has a hot air inlet 301 and a passage 303 from this inlet to a hole 305 in partition 287. Air is delivered to inlet 301 via a tube 307 (see FIG. 1) from a heat pocket in the exhaust manifold H of the engine, and enters cover 279 through hole 305 for heating coil 281.

Choke lever 289 has another arm 309 interconnected by a link 311 with a vacuum-responsive choke piston 313 slidable in a choke cylinder 315 formed as a part of casing 277. The outer end of cylinder 315 is closed by a plug 317. This space in cylinder 315 between the piston and the plug is in communication with mixture conduit 3 downstream from the throttle valve 5 via passaging in section S1 such as indicated at 319 in FIG. 4. The arrangement is such that choke piston 313 is adapted to move toward the left as viewed in FIG. 4 under the influences of vacuum in the left end of cylinder 315 to swing the chock valve 275 open.

A throttle arm 323 (see FIG. 3) is fastened on the other end of the throttle shaft 107 from arm 263. Throttle arm 323 has a finger 325 engageable with a stop screw 327 adjustably threaded in a lug 329 on throttle body S4 to determine the fully closed curb idle position of throttle valve 5. A fast idle cam 331 is pivoted at 333 on section S1. This is engageable by a fast idle screw 335 on throttle arm 323. Choke shaft 273 has an arm 337 on its other end from lever 289 interconnected by a link 339 to an arm 341 pivoted at 333 along with the fast idle cam but adapted to rotate relative to the cam. Arm 341 has a tang 343 engageable behind a radial arm 345 on the fast idle cam. A coil spring 347 on pivot 333 has one end 349 engaging tank 343 and its other end 351 hooked to the cam to tend the bias tang 343 against cam arm 345. The arrangement is such that the fast idle cam is allowed to back off (swing counterclockwise as viewed in FIG. 3) on opening of the choke valve (clockwise rotation of choke shaft 273 as viewed in FIG. 3) and disengagement of fast idle screw 335 from the cam on opening of the throttle valve 5. Arm 341 may swing counterclockwise as viewed in FIG. 3 independently of the fast idle cam to allow the choke valve to open while the fast idle cam remains stationary due to engagement of screw 335 with the cam, and then spring 347 backs the cam off to the point where arm 345 on the cam engages tang 343. Throttle arm 323 has a finger 353 engageable with arm 341 on full opening of the throttle valve 5 to open the choke valve for unloading purposes.

The fuel bowl 1 is vented to the mixture conduit 3 via a vertical hole 355 in cover section S3 (see FIG. 8) which registers with a vertical hole 357 in section S2, a vent tube 359 extending into the mixture conduit from the lower end of hole 357. This vent tube is inclined toward and has a beveled end facing the inlet end of the mixture conduit 3. Hole 355 opens up to the space above gasket 93 via a hole 361 in the gasket. This space is closed off from the fuel bowl by the gasket 93 except at the center hole 95 (FIG. 7) in the gasket, so as to avoid splashing of fuel from the bowl into the vent passage 355, 357 on cornering, sudden starts or panic stops of the vehicle.

In the operation of the carburetor, fuel for high speed operation of the engine (throttle valve 5 open) is delivered from the bowl 1 through the orifice in the metering jet 141, at a rate dependent upon the position of metering rod 155, downward through hole 143, thence through cross-passage 145 to the fuel well 149, thence up through the fuel well to the recess 153 in cap 47, and thence downward through nozzle 7 into mixture conduit 3. The position of metering rod 155 depends on vacuum in cylinder 165 below the step-up piston 163, the metering rod being up when vacuum is low for increased fuel flow and being down when vacuum is high for decreased fuel flow. The effect of vacuum on the step-up piston 163 and the metering rod 155 may be modified by the action of arm 271 on the piston 163 in response to opening of the throttle valve 5. Fuel for idling (throttle valve 5 closed or almost closed as determined by the fast idle cam 331) is delivered from fuel well 149 via idle tube 193, economizer 199, and idle system passaging 201, 203, 205, 207, etc. through the idle port 215 and the idle adjustment screw port 219 to the mixture conduit 3 downstream from the throttle valve 5. On opening of the throttle valve 5, pump piston 225 is pulled upward as previously described to pump accelerating fuel to the mixture conduit 3 via pump outlet passage 239, recess 245 in cap 47, hole 247 in metering block 45, hole 249 in boss 33, orifice 251 and pump jet 253. On an upward discharge stroke of the pump piston 225, the pump discharge check valve 243 rises, and this closes off the anti-siphon bleed hole 255.

The fuel system section S2 of the carburetor, constituted by the metering block 45 and the cap 47, and mounted on top of stem 33 in the fuel bowl 1, is suspended in fuel bowl 1 enclosed between the fuel bowl section S1 and the cover S3. Accordingly, it is isolated from heat in the engine compartment of the vehicle and is isolated from conduction of heat thereinto from section S1 either by being made of plastic, or, if made of metal, by the heat insulation characteristic of the gasket 51. This reduces the effect of engine compartment heat on fuel system section S2, and reduces the tendency toward premature volatilization of fuel in the fuel passages of the high speed fuel system 135, the idle fuel system 137 and the accelerating fuel system 139. Additionally, the bottom of the fuel bowl 1 is subject to the cooling effect of air and air/fuel mixture flowing through the mixture conduit 3, and this has a tendency to cool the fuel in the bowl. The metering block 45 being substantially immersed in fuel in the bowl is thereby additionally cooled.

A signficant feature of the construction is that the enentrances to all three fuel systems are adjacent the bottom of the bowl. Thus, even though the fuel level in the bowl should be lowered by volatilization of fuel under unusual conditions, it is unlikely that the level would drop below the fuel system entrances. However, the fuel level in the bowl generally remains relatively high even after a so-called "soak," i.e., a short period (fifteen minutes) during which the engine is stopped after a hard, hot run. Accordingly, difficulty in starting after such a soak is avoided.

It will be observed that all metering components of the high speed fuel system, such as the metering jet 141 and the metering rod 155, also such metering components of the idle fuel system as the idle fuel tube 193 and the economizer 199, and the pump 223 are all incorporated in the fuel system section S2 (comprising metering block 45 and cap 47). This makes it possible to pretest the fuel system section S2 by itself prior to assembly with the other sections for checking the fuel metering performance and the operation of the auxiliary pump. This eliminates the necessity of assembling carburetor components prior to testing required by prior constructions, as, for example, where the fuel well is in the fuel bowl section. For service in the factory or the field, dust cover 89 and gasket 93 may be readily removed for access to fuel system section S2 without removing cover section S3. Screws 63 may then be removed for removal of cap 47 (which carries all idle calibration components except the idle ports) for servicing or replacement of the cap. Metering block 45 is also readily removed for service or replacement.

FIG. 19 illustrates a modification wherein a main fuel tube 371 is provided extending down into the fuel well 149 from the cap 47. The latter extends down from an inclined hole 373 in cap 47 which communicates with the upper end of the nozzle 7. The outer end of hole 373 is plugged as indicated at 375. The idle fuel tube 193 extends down from cap 47 within the main fuel tube 371. Instead of bleeding air into the fuel well via the perforated tube 189, air is bled into the well via a bleed such as indicated at 377 in the cap 47.

FIG. 20 illustrates a modificaion of FIG. 19 wherein, instead of having idle fuel tube 193 within the main fuel tube 371, the idle fuel tube is alongside the main fuel tube, and a partition 379 is provided between the main fuel tube and the idle fuel tube.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A carburetor comprising an integral body casting formed with a fuel and air mixture conduit adapted to be normally positioned horizontally and a fuel bowl positioned above said mixture conduit, a throttle valve movably mounted within said mixture conduit, a stem extending upwardly from the bottom of said fuel bowl and integrally formed with said body casting, a plate fixed over the top of said fuel bowl as a cover therefor, said stem being spaced from the side walls of said fuel bowl and said cover plate, a subassembly structure forming a fuel system for said carburetor fixed to the top of said stem and spaced from said fuel bowl cover plate, said subassembly structure having a plurality of portions thereof depending and spaced from said stem, said subassembly depending portions each having a different terminal end adjacent to and spaced from the bottom of said fuel bowl, said each subassembly depending portion having a different passage therein extending from said terminal end thereof to the top of said stem, said body casting and said stem having a plurality of passages therein with a different one thereof connected to each one of said passages in said subassembly depending portions, said plurality of passages extending through said stem to said mixture conduit.

2. The invention of claim 1 including one of said subassembly depending portions having a fuel well forming a part of said different passage therein, means including one of said plurality of passages in said body casting connecting said fuel well to said mixture conduit adjacent to said throttle valve.

3. The invention of claim 2 including a fuel jet mounted within said terminal end of said one subassembly depending portion.

4. The invention of claim 2 including an accelerating fuel pump mounted within said different passage of another one of said subassembly depending portions.

5. The invention of claim 3 including a metering rod slidably mounted in said subassembly and having one end of varying thickness extending through said fuel jet, and operating means mounted on said fuel bowl cover and operatively connected to said throttle valve and said metering rod to move said metering rod simultaneously with movement of said throttle valve to correspondingly vary fuel flow through said jet.

6. The invention of claim 1 including one of said subassembly depending portions having a fuel well forming a part of said different passage therein, an idle fuel tube open at both ends and mounted on said subassembly structure with one end extending within said fuel well, and an air bleed tube having a closed end suspended within said fuel well and an open end fixed to said subassembly structure, said air bleed tube having a plurality of apertures in the wall of said suspended end to provide fuel and air flow from said well into said air bleed tube, means including one of said plurality of passages connecting the other end of said idle fuel tube to said mixture conduit adjacent to said throttle valve and means including another one of said plurality of passages connecting said open end of said air bleed tube to said mixture conduit upstream of said throttle valve.

7. A carburetor comprising an integral structure formed with a mixture conduit having a venturi section and a fuel bowl having a bottom portion contiguous to said venturi section, a nonmetallic subassembly structure enclosed within and spaced from all portions of said fuel bowl, said subassembly structure forming a fuel feed system for said carburetor, said fuel bowl including a metallic support extending from said bottom portion and mounting said subassembly, means heat insulatingly spacing said subassembly structure from all portions of said metallic support, said subassembly structure including said support having fuel passages therethrough to said mixture conduit, a metering block having a horizontal web fixed to the top of said metallic support and a pair of separate depending portions each having a fuel passage therethrough and extending downwardly at opposite sides of said web into said fuel bowl, said separate depending portions being spaced from the walls of said fuel bowl and from said support, each of said depending portions having a terminal end adjacent to the bottom of said fuel bowl with said fuel passage therein opening through said terminal end into said fuel bowl, means forming an adjustable fuel restriction in the terminal end of one of said depending portions, an accelerating pump within said fuel passage of the other one of said depending portions, and a cap fixed to the top of said web and having fuel passages connecting said fuel passages in said depending portions with said fuel passages in said support.

References Cited in the file of this patent

UNITED STATES PATENTS

| | | | |
|---|---|---|---|
| 1,281,044 | Manning et al. | Oct. 8, | 1918 |
| 1,317,967 | Edwards | Oct. 7, | 1919 |
| 1,454,730 | Lukacsevics et al. | May 8, | 1923 |
| 1,741,401 | Bryan | Dec. 31, | 1929 |
| 1,823,018 | Wolford | Sept. 15, | 1931 |
| 1,826,061 | Ensign | Oct. 6, | 1931 |
| 2,162,056 | Bracke | June 13, | 1939 |
| 2,207,456 | Coffey | July 9, | 1940 |
| 2,626,790 | Betcher | Jan. 27, | 1953 |
| 2,694,560 | Olson | Nov. 16, | 1954 |
| 2,728,563 | Henning | Dec. 27, | 1955 |
| 2,771,282 | Olson et al. | Nov. 20, | 1956 |
| 2,943,849 | Csecs | July 5, | 1960 |